United States Patent
Le et al.

(10) Patent No.: US 11,774,573 B2
(45) Date of Patent: Oct. 3, 2023

(54) SYSTEM AND METHOD TO DETERMINE LOW-SPEED AND STATIONARY STATE OF A RAIL VEHICLE

(71) Applicant: THALES CANADA INC., Toronto (CA)

(72) Inventors: Adam Le, Toronto (CA); Tyler Daoust, Toronto (CA); David Beach, Toronto (CA); Alon Green, Toronto (CA)

(73) Assignee: THALES CANADA INC., Toronto (CA)

( * ) Notice: Subject to any disclaimer, the term of this patent is extended or adjusted under 35 U.S.C. 154(b) by 276 days.

(21) Appl. No.: 17/066,946

(22) Filed: Oct. 9, 2020

(65) Prior Publication Data

US 2021/0109207 A1    Apr. 15, 2021

Related U.S. Application Data

(60) Provisional application No. 62/913,517, filed on Oct. 10, 2019.

(51) Int. Cl.
*G01S 13/60* (2006.01)
*G01S 13/86* (2006.01)
*B61L 25/02* (2006.01)

(52) U.S. Cl.
CPC .......... *G01S 13/60* (2013.01); *B61L 25/021* (2013.01); *G01S 13/86* (2013.01)

(58) Field of Classification Search
CPC .......... G01S 13/60; G01S 13/86; G01S 13/52; G01S 13/931; B61L 25/021
See application file for complete search history.

(56) References Cited

U.S. PATENT DOCUMENTS

| | | | |
|---|---|---|---|
| 6,587,763 B2 | 7/2003 | Ishikawa | |
| 6,888,622 B2 | 5/2005 | Shimomura | |

(Continued)

FOREIGN PATENT DOCUMENTS

| | | | | |
|---|---|---|---|---|
| CA | 2977730 A1 | 9/2016 | | |
| CA | 2977730 C | * 4/2018 | .......... | B61L 15/0063 |

(Continued)

OTHER PUBLICATIONS

17066946_2022-12-28_WO_2016030208_A1_M.pdf, machine translation of WO-2016030208-A1 (Year: 2016).*

(Continued)

*Primary Examiner* — Timothy A Brainard
*Assistant Examiner* — Kenneth W Good
(74) *Attorney, Agent, or Firm* — HAUPTMAN HAM, LLP (57) ABSTRACT

A system for determining a stationary state of a rail vehicle on a track includes a first radar mounted at an end of the rail vehicle and a second radar mounted at another end of the rail vehicle. A speed sensor is mounted on the rail vehicle. A series of fixed reflective track features are found along the track. A processing unit, communicably connected with the speed sensor, the first radar and the second radar receives data from the first radar and the second radar corresponding to the distance to the fixed reflective track features and determines the stationary state or low-speed condition of the rail vehicle and checks the state or condition by comparing it with an output of the speed sensor.

20 Claims, 10 Drawing Sheets

(56) References Cited

U.S. PATENT DOCUMENTS

| | | |
|---|---|---|
| 7,260,022 B2 | 8/2007 | Schliep et al. |
| 7,504,989 B2 | 3/2009 | Tsuchihashi et al. |
| 8,217,829 B2 | 7/2012 | Shingyoji |
| 9,043,132 B2 | 5/2015 | Obi |
| 9,110,164 B2 | 8/2015 | Moriuchi et al. |
| 9,162,682 B2 | 10/2015 | Hohm et al. |
| 9,255,988 B2 | 2/2016 | Zeng et al. |
| 9,260,115 B2 | 2/2016 | Tokimasa et al. |
| 9,272,711 B1 | 3/2016 | Sivaraman |
| 9,610,961 B2 * | 4/2017 | Breuing ............... G01P 3/00 |
| 9,658,327 B2 | 5/2017 | Kawabe et al. |
| 9,903,945 B2 | 2/2018 | Song et al. |
| 9,958,541 B2 | 5/2018 | Kishigami et al. |
| 10,267,907 B2 | 4/2019 | Shikatani et al. |
| 10,371,809 B2 | 8/2019 | Satou et al. |
| 2015/0048968 A1 | 2/2015 | Uyama et al. |
| 2018/0156909 A1 | 6/2018 | Kitamura |
| 2018/0299545 A1 | 10/2018 | Arndt et al. |
| 2019/0018133 A1 | 1/2019 | Takada |
| 2019/0101634 A1* | 4/2019 | Baheti ................. G01S 13/62 |
| 2019/0135317 A1* | 5/2019 | Hilleary .............. G01S 13/931 |
| 2019/0257936 A1 | 8/2019 | Balogh et al. |
| 2020/0258385 A1* | 8/2020 | Mahajan ............. G01S 17/931 |

FOREIGN PATENT DOCUMENTS

| | | | | |
|---|---|---|---|---|
| SE | 515571 C2 * | 9/2001 | ............ | B61L 25/021 |
| WO | 2016030208 A1 | 3/2016 | | |
| WO | WO-2016030208 A1 * | 3/2016 | ............ | B61L 25/021 |
| WO | 2019148000 A1 | 8/2019 | | |

OTHER PUBLICATIONS

17066946_2023-06-06_SE_515571_C2_M.pdf, machine translation of SE-515571-C2 (Year: 2001).*

International Search Report and Written Opinion issued in corresponding International Application No. PCT/IB2020/059520, dated Dec. 30, 2020, pp. 1-11, Canadian Intellectual Property Office, Quebec, Canada.

Reissland et al., T., "Robust Correlation based True-Speed-over-Ground Measurement System employing a FMCW Radar," 15th European Radar Conference (EuRAD) 2018, pp. 87-90.

Mei et al., T.X., "Measurement of vehicle ground speed with inertia sensors—computation issues," The University of Leeds, School of Electronic and Electrical Engineering, Computers in Railways XI, pp. 777-786, Jan. 1, 2008.

* cited by examiner

SYSTEM AND METHOD TO DETERMINE LOW-SPEED AND STATIONARY STATE OF A RAIL VEHICLE

PRIORITY CLAIM

The present application claims the priority of U.S. Provisional Application No. 62/913,517, filed Oct. 10, 2019, which is incorporated here by reference in its entirety.

BACKGROUND

A communication-based train control (CBTC) system relies on the accuracy and precision of speed sensors to make on-board low-speed determinations including stationary state determinations. The most common type of speed sensor used in rail applications is the tachometer, which uses wheel revolution measurements to calculate changes in position and speed. A tachometer suffers from inaccuracies, for example, those due to wheel slip in low friction conditions. In such conditions, the sensor will report a stationary state when the vehicle is, in fact, sliding, or the tachometer reports motion due to wheel spin while the vehicle is not actually moving.

Other types of sensors such as accelerometers determine that a train is in a stationary state by integrating acceleration or speed. This determination suffers from integration errors due to existing sensor bias. Additionally, an integration requires changes in speed to provide a meaningful result because a constant speed is indistinguishable from motionlessness.

Newer imaging technologies using camera or LiDAR serve as good position measurement devices; however, they suffer from low reliability due to an array of environment conditions that obstruct their view.

DETAILED DESCRIPTION

The following disclosure provides many different embodiments, or examples, for implementing different features of the provided subject matter. Specific examples of components, values, operations, materials, arrangements, etc., are described below to simplify the present disclosure. These are, of course, merely examples and are not intended to be limiting. Other components, values, operations, materials, arrangements, etc., are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
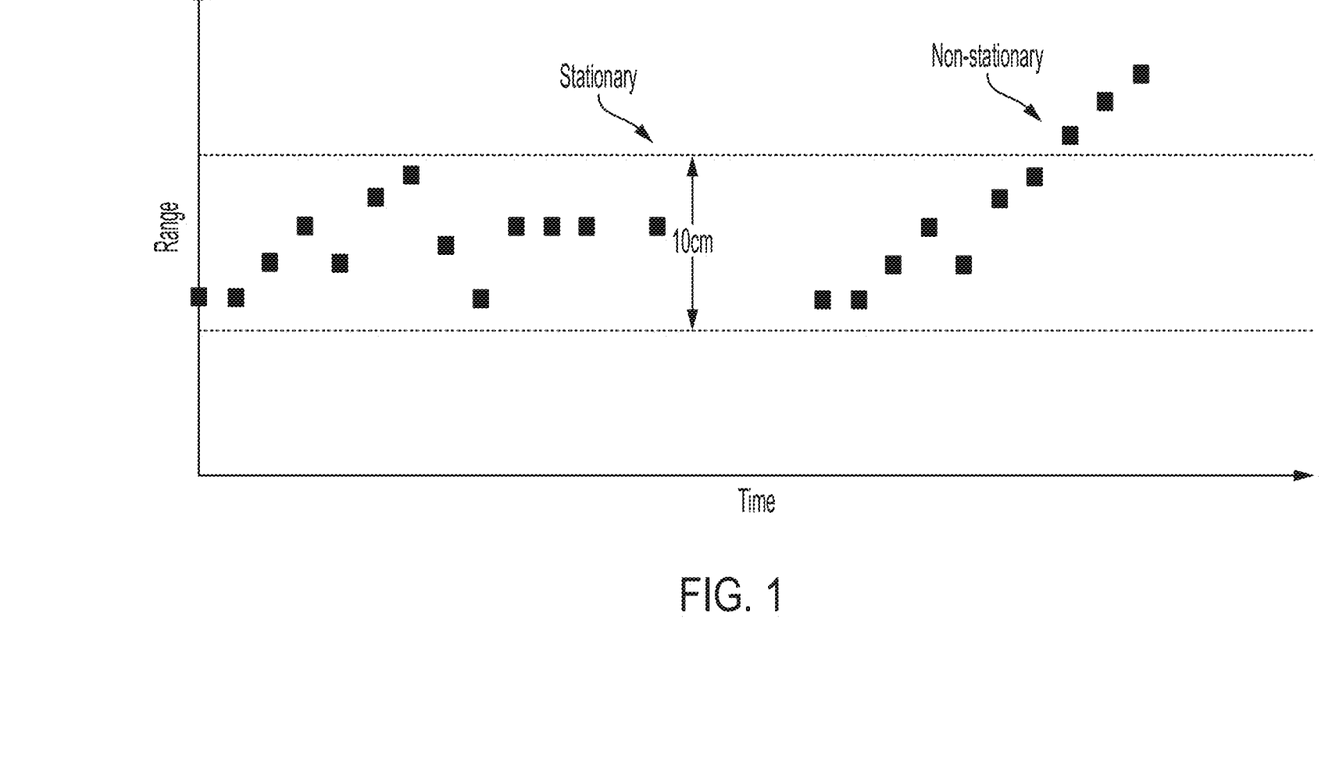
FIG. 1 is a graph of the measured range from a vehicle to a target over time, in accordance with some embodiments.

FIG. 1 depicts a graph 100 of the measured range (y axis) from a vehicle to a target over time (x axis). Using the data forming the basis for the graph, the low-speed determination system and method according to one or more embodiments is able to determine the movement-state of the vehicle. If the range to the target does not change or changes within predefined displacement, for example 10 cm, during a predetermined time period, the vehicle is determined to be in a stationary state during the predetermined time period. If the range to the target changes more than the predefined displacement during the predetermined time period, the vehicle is determined to be in a non-stationary (or moving) state during the predetermined time period.

Using the range measurement capability of radar, the low-speed determination system and method measures the round-trip time-of-flight (TOF) of a transmitted signal to reflective objects within the radar field-of-view (FOV) to determine the stationary state of the rail vehicle. The high availability of reflective metallic objects in the rail environment makes this method generally effective. In some embodiments, no additional reflective metallic objects other than those already present in the rail environment are needed.

In accordance with one or more embodiments, the low-speed determination system and method uses radar range-to-target measurement technology to measure vehicle motion at low speed and to determine when a vehicle is in a stationary state in rail applications. A low speed is typically less than 0.5 kph. A stationary state is a speed typically less than 0.5 kph and displacement less than 10 cm.

Figure 2A:
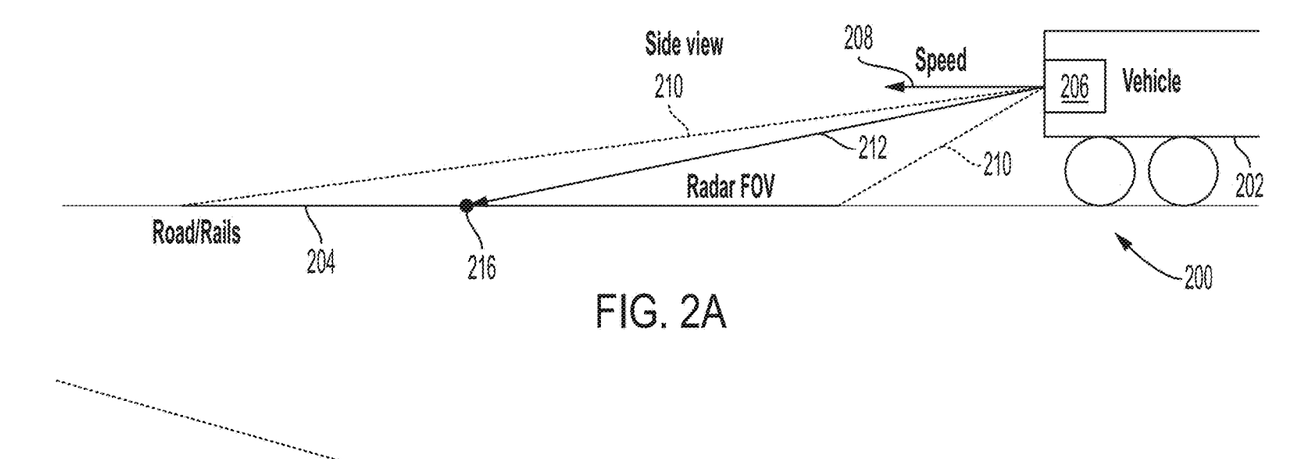
FIGS. 2A and 2B depict a side-view and top-view of a simplified low-speed determination system, in accordance with some embodiments.
Figure 2B:
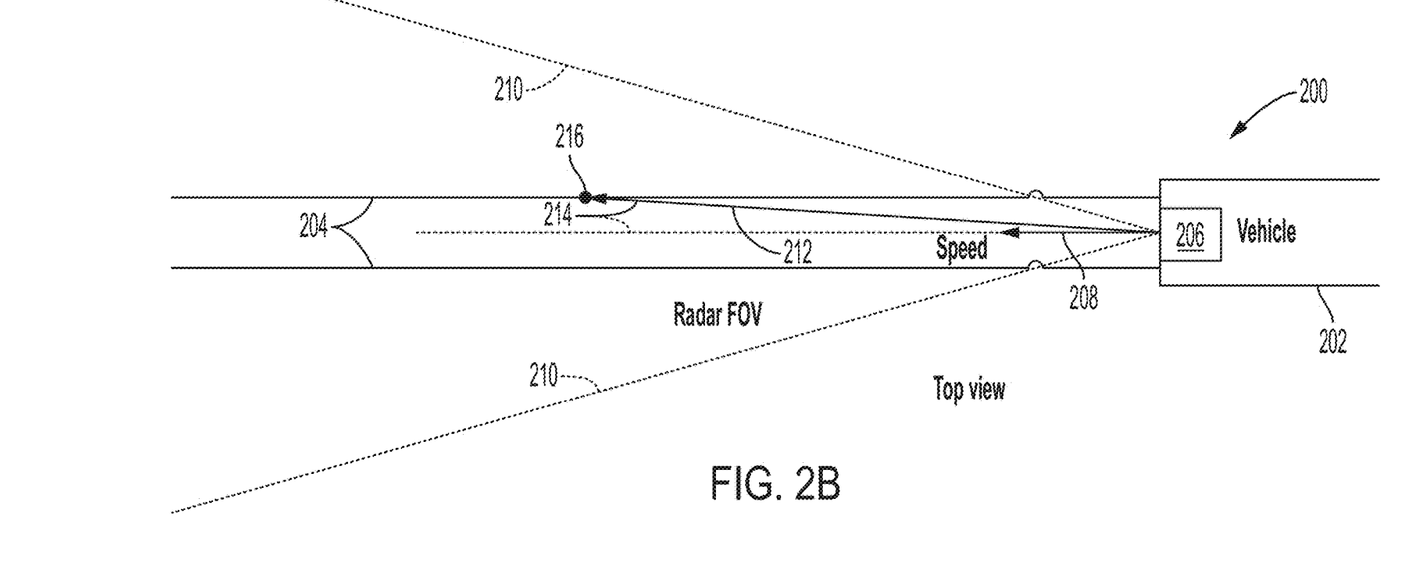

FIG. 2 depicts a side-view and a top-view of a simplified low-speed determination system 200, in accordance with an embodiment. A vehicle 202, such as a train, subway, monorail, car, truck, bus or other mobile system, moves along rail, road, track or another limited course 204. The vehicle 202 includes a radar 206 mounted at one end. The vehicle 202 moves along the rail 204 with a speed designated by arrow 208. The radar 206 has a FOV designated by dotted lines 210. The radar 206 determines the radial range 212 to an object 216 and the relative radial speed, using Doppler frequency shift. The radar 206 determines the azimuth and elevation angles 214 of the object 216.

In accordance with an embodiment, one or more radars 206 are installed on the front and rear face of a vehicle 202 or underneath the vehicle so that the radars have within their FOV 210 the underlying track 204 from a certain minimum distance (typically 3 m to 5 m) to a certain maximum distance (typically 10 m to 50 m). A typical radar unit 206 measures the distance to an arbitrary target 216 as well as the relative radial speed and the radial range between the radar 206 and the target 216. The relative radial speed is measured using the Doppler frequency shift. The radial range is measured using the round-trip time of flight. Depending on the radar design, additional information such as the relative azimuth and elevation angles to the target 216 is determinable.

Given that the radar FOV 210 is bound between the radar's minimum range (typically 3 m to 5 m) and the radar's maximum range (typically 10 m to 50 m), when the vehicle 202 is moving at high speed, the target 216 detected by the radar 206—stays within the FOV 210 for a very short amount of time (typically 1 to 5 seconds). On the other hand, when the vehicle 202 is stationary or moving at a very low speed (typically <0.5 kph), the target 216 remains within the FOV 210 for an extended period of time (typically more than 5 seconds). When the vehicle 202 moves at speeds less than 0.5 kph (~0.14 m/s), the target stays within the FOV for about 3 minutes to 6 minutes, e.g. 40 m/0.14 m/s.

In accordance with an embodiment, the target 216 is a metallic railway track feature which, under normal operating conditions, remains fixed relative to the ground. With a software implemented detection and classification algorithm, it is possible to detect metallic track features such as rails, rail ties and rail baseplates within the radar's FOV 210 with a high level of confidence when the vehicle 202 is stationary or moving at low speed. Since the output of the radar 206 is a range or distance measurement 212 to target 216 that is known to be a stationary object, if the vehicle 202 remains stationary, then the speed and displacement values derived from the radar range measurements 212 are not adversely influenced by radar sensor drift or bias. Given that the radar 206 is focused on a consistent target 216, both the range value and error is bounded and subject to perturbations of the vehicle body, such as vehicle body vibration when an engine or other device on the vehicle is operating.

The low-speed determination system and method, in accordance with one or more embodiments, uses only one radar 206 to determine the stationary state. Using two or more radars 206 enables the minimization of errors due to environmental factors. In accordance with one or more embodiments, at least two radars 206 are used in order to achieve a high integrity level such as SIL 4. For a system to be rated as Safety Integrity Level (SIL) 4, the system is required to have demonstrable on-demand reliability. SIL 4 is based on International Electrotechnical Commission's (IEC) standard IEC 61508 and EN standards 50126 and 50129. SIL 4 requires the probability of failure per hour to range from $10^{-8}$ to $10^{-9}$.

Since the radar range measurement 216 determines the relative position of a target 216 with respect to the radar 206, if the target 216 is a moving object, then the resultant vehicle position and speed measurements with respect to the ground will be incorrect because the radar 206 measures the relative speed to the target 216. One source of such error is moving reflective objects (such as metallic objects) which move within the radar FOV 210 on the tracks 204 (for example, a person riding a bicycle on the track in front of a stationary vehicle or a maintenance worker walking with metal equipment ahead of the vehicle). To address such a scenario, two or more radars 206 are installed at different locations on the vehicle 202 so that each radar 206 has an independent non-overlapping field of view with respect to the other radar. In some embodiments, in order to filter the adverse influence of moving objects within the radar FOV 210, a radar 206 is tilted down in such a way that the FOV 210 is further limited in terms of the maximum range within which the radar 206 detects targets 216.

The low-speed determination system and method uses TOF based radar range to targets 216, within the radar FOV 210, measurements for determining stationary state allows the radar 206 to be installed on the vehicle's body 202, which is independent of the wheel motion and therefore is not sensitive to wheel spin and slide conditions. In case the vehicle 202 is equipped with wheel sensors, such as tachometer or speed sensor, the low-speed determination system and method detects and compensates for wheel spin and slide.

Compared to accelerometers or sensors detecting speed, the radar TOF based range measurement method is neither sensitive to nor influenced by errors as a result of acceleration or speed integration in the time domain due to sensor bias error.

The low-speed determination system and method is more reliable than methods based on imaging technologies, such as a camera, for stationary state determination because imaging technology is susceptible to interference due to weather conditions, whereas the system and method according to one or more embodiments is less sensitive to weather conditions due to the existence of large, continuous, metallic reflective targets in the rail environment (i.e., rails, base plates, and the like).

Figure 3:
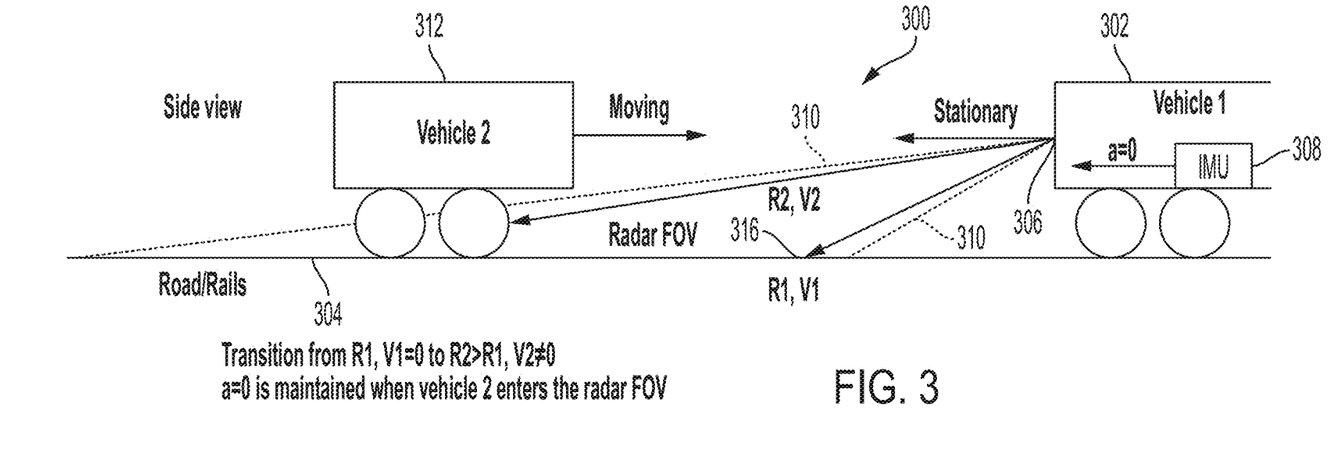
FIG. 3 depicts a side-view of a low-speed determination system, in accordance with some embodiments.

FIG. 3 depicts a side-view of a low-speed determination system 300, in accordance with an embodiment. A first vehicle 302 is configured to move on rails 304. In this scenario, the first vehicle 302 is stationary (a=0). The first vehicle 302 has a radar 306 mounted on one end and an inertial measurement unit 308. The radar 306 has a FOV 310, designated by dotted lines. A second vehicle 312 is shown entering the FOV 310. A first object 316 is detected by the radar 306 at range R1 and the velocity of the first vehicle is zero (V1=0). The second vehicle 312 is detected by the radar 306 at range R2. The second vehicle 312 has a velocity that is greater than zero (V2=/0). The IMU 308 measures the acceleration of the first vehicle 302 at zero (a=0).

An IMU or a single axis accelerometer 308, is used to distinguish between motion detected by the radar 306 as a result of the motion of objects within the radar FOV 310 while the first vehicle 302 is not moving, the motion of the first vehicle 302 while no objects within the radar FOV 310 are moving or any combination of these scenarios.

When the speed of the first vehicle 302 is changing, the IMU 308 will measure the acceleration, which provides an indication that the first vehicle 302 is moving and therefore the vehicle is in a non-stationary state. However, if the first vehicle 302 is not moving, the IMU 308 will not measure any acceleration and the speed measured by the radar 306 is due to moving objects 312 external to the first vehicle 302.

In this way, the IMU 308 provides a complementary measurement to the radar range measurements.

An IMU or a single axis accelerometer 308 allows the low-speed determination system and method to distinguish whether the speed measured by the radar 306 is due to moving objects within the radar FOV 310 or due to motion of the vehicle 302 on which the radar 306 is installed, as long as the vehicle 302 accelerates or decelerates.

Radar 306, in accordance with an embodiment, is an automotive radar, e.g., a Frequency Modulated Continuous Wave radar. The low-speed determination system and method determines the range to targets 312 and 316 within the FOV 310 of the radar 306, based on TOF measurements. The radar 306 emits a radio frequency wave in the microwave spectrum (typically 24 GHz ISM band or 77-81 GHz band) and when the waves hit a reflective object that resides within the radar's FOV 310 the wave are reflected either in a retroreflective manner or a diffused manner. Because the emitted waves are frequency coded, the radar 306 associates each received signal with the corresponding transmitted signal and therefore determines the round trip TOF of the signal. From the round trip TOF, the range to target 312 is determined as shown in Equation (1).

$$\text{Range} = c/\text{TOF}_{Round\ Trip}, \text{ where } c \text{ is the speed of light} \quad \text{Equation (1)}$$

Figure 4:
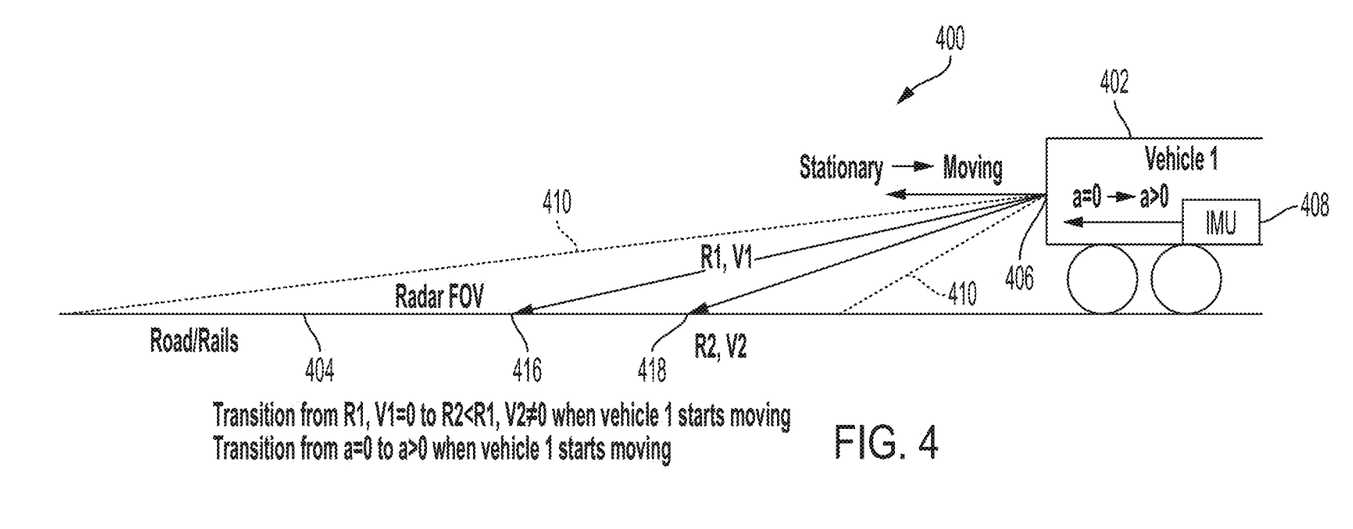
FIG. 4 depicts a side-view of a low-speed determination system, in accordance with some embodiments.

FIG. 4 depicts a side-view of a low-speed determination system 400 in accordance with an embodiment. A vehicle 402 is configured to move along rails 404 in the same manner as vehicle 302 (FIG. 3) does on rails 304. The vehicle 402 has a radar 406 installed at one end and an IMU 408. The radar 406 has a FOV 410, designated by the dotted lines. In operation, the radar detects a first object 416 at a range R1 and determines the velocity V1 of the vehicle 402 is zero (V1=0) with respect to the object 416. When the vehicle 402 transitions from a stationary state to a moving state, the radar 406 detects a second object 418 at a range R2, where R2<R1 and determines the velocity V2 of the vehicle 402 (V2>0) with respect to the object 418. The IMU 408 initially measured the acceleration of the stationary vehicle 402 as zero (a=0) and then measures the acceleration of the moving vehicle 402 as greater than zero (a>0).

Figure 5A:
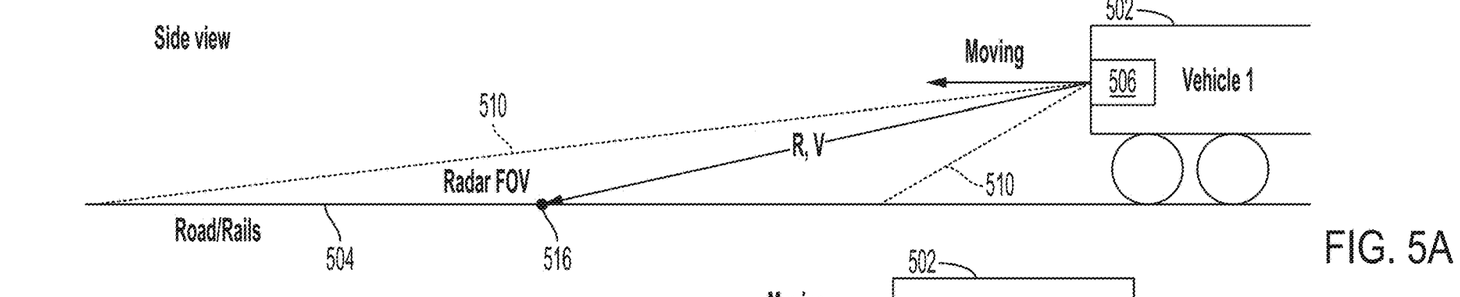
FIGS. 5A, 5B and 5C depict a sequence of time periods of operation of a low-speed determination system, in accordance with some embodiments.
Figures 5B, 5C:
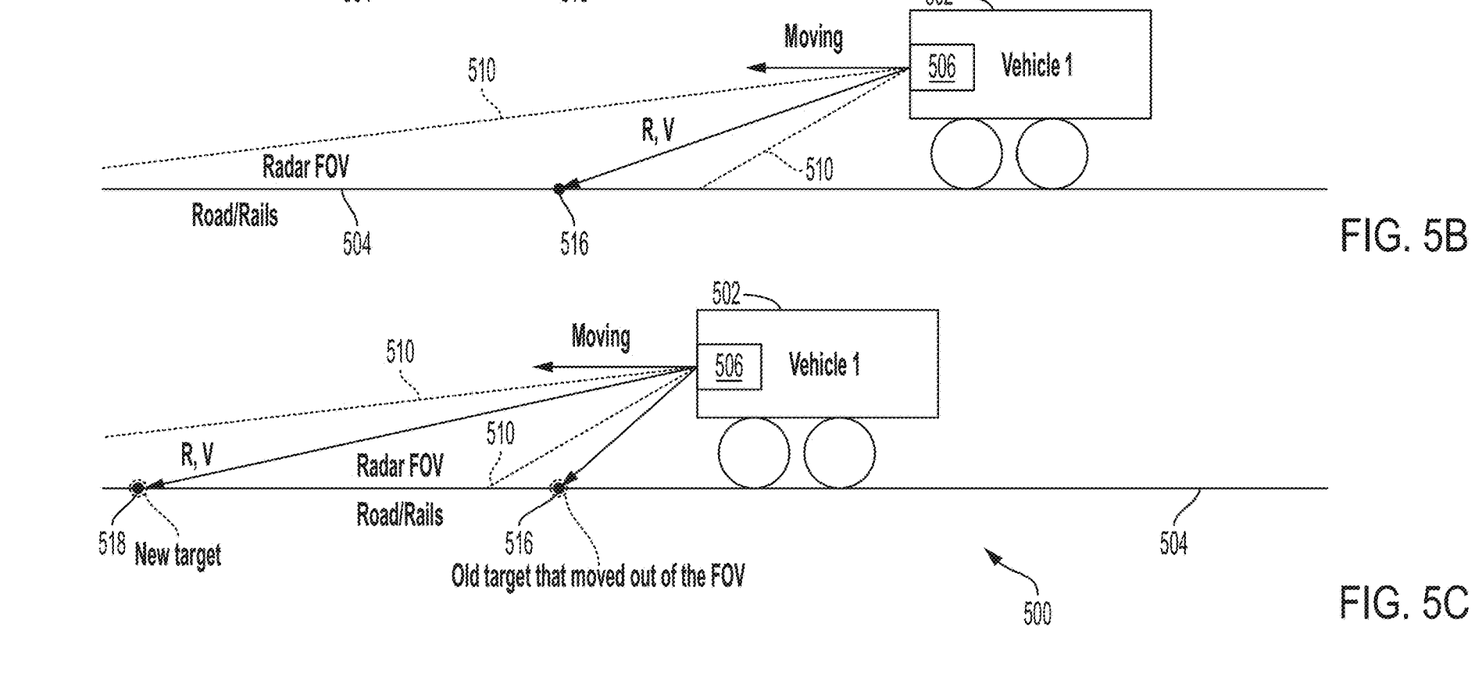

FIGS. 5A, 5B and 5C depict a sequence of time periods of operation of a low-speed determination system 500, in accordance with an embodiment. A vehicle 502 is configured to move along rails 504. A radar 506 is mounted at one end of the vehicle 502 and has a FOV 510. When the vehicle 502 is moving, the radar 506 detects an object 516 within the radar FOV 510. Using the radar detection data, the low-speed determination system is able to determine the range R to the object 516 and the velocity V of the vehicle with respect to the object 516. As the vehicle continues to move, the low-speed determination system continues to determine the range R to the object 516 and the velocity V of the vehicle 502 with respect to the object 516. When the object 516 is no longer within the radar FOV 510, the low-speed determination system detects object 518 within the radar FOV 510 and determines the range R to the object 518 and the velocity V of the vehicle 502 with respect to the object 518.

If the vehicle 502 is stationary and starts to move forward, the radar 506 will continue to measure the range R to and relative velocity V with respect to the same target 516 as long as this target remains within the FOV 510 and only when the target 516 is not "visible" any more (i.e., the target is outside the FOV 510) will the radar 506 start to measure the range R to and relative velocity V with respect to another target 518 farther ahead. Then, the range R to the new target 518 will decrease until the target 516 is no longer "visible". If the vehicle 502 is moving in reverse, the range R increases instead of decreases.

Figure 6:
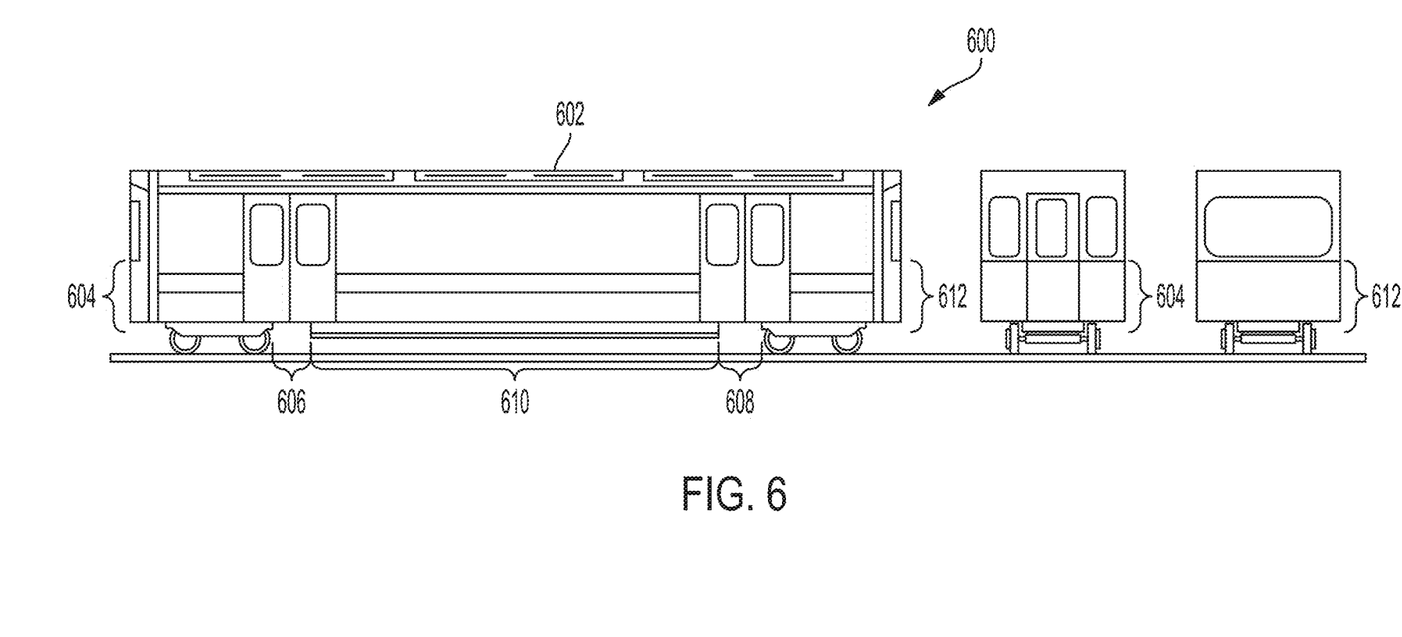
FIG. 6 is a diagram showing possible areas of placement for radars with respect to the vehicle body, in accordance with some embodiment.

FIG. 6 is a diagram 600 showing possible areas of placement for radars, such as radars 206, 306, 406 and 506, with respect to the vehicle body 602 such that at least two radars are installed with independent field of view. In accordance with one or more embodiments, radars are at the front end 604 of the vehicle body. In accordance with one or more embodiments, radars are beneath the doors 606 and 608 of the vehicle body 602. In accordance with one or more embodiments, radars are placed underneath 610 the vehicle body 602. In accordance with one or more embodiments, radars are placed at the rear end 612 of the vehicle body. In at least some embodiments, the radar at the end (front end 604 or rear end 612) is at a front end surface substantially perpendicular to the rail. In at least some embodiments, the radar at the end (front end 604 or rear end 612) is at a front end surface substantially parallel to the rail. In at least some embodiments, the radar at the end (front end 604 or rear end 612) is along a front portion of the vehicle from in front of the wheels to the top of the end (front end 604 or rear end 612).

Figure 7:
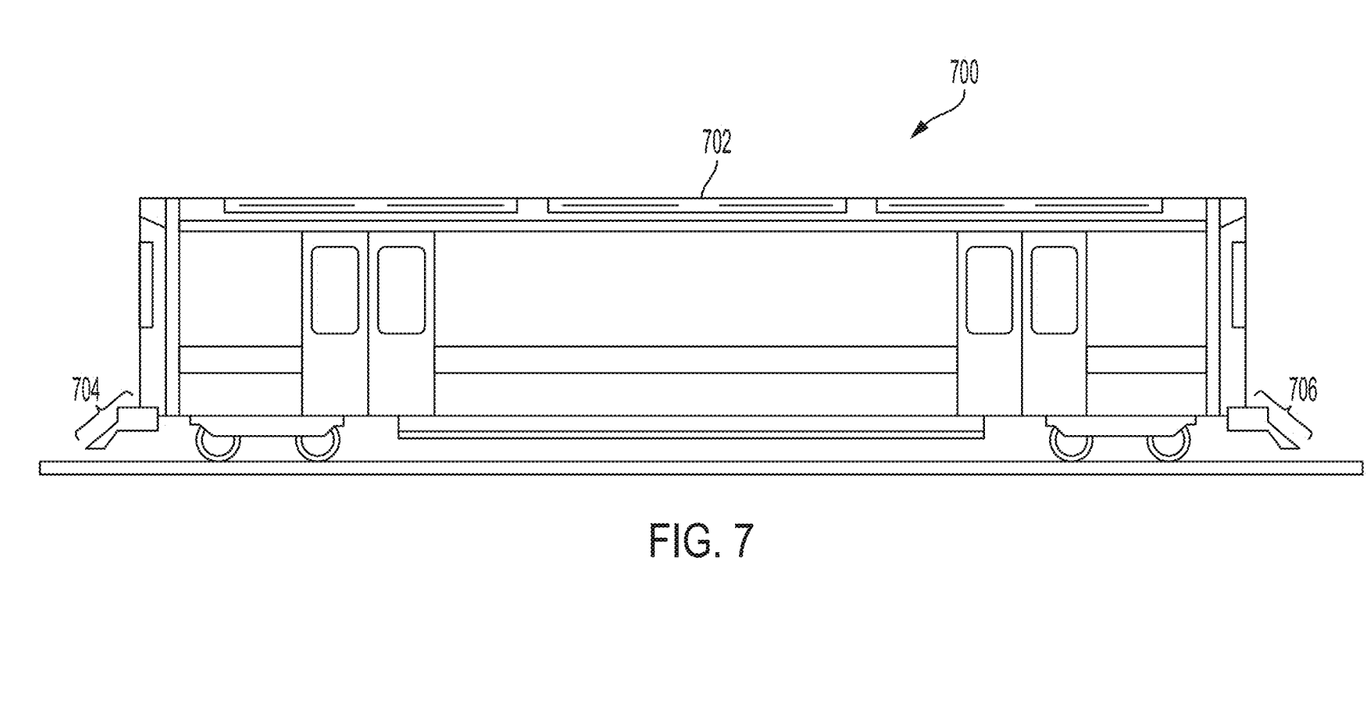
FIG. 7 is a depiction of a radar installation schema, in accordance with an embodiment.

FIG. 7 depicts a radar installation schema 700 for a vehicle body 702, in accordance with an embodiment. One radar set 704 (single radar or multiple radars) is installed on the front end of the vehicle body 702 facing outward from a central region of the vehicle body 702 and a second radar set 706 is installed on the rear end of the vehicle body 702 facing outward from the central region of the vehicle body 702. In this manner, the first radar set 704 and the second radar set 706 have independent fields of view so that an object (stationary or moving) that adversely influences the radar measurements will not simultaneously influence both radars 704 and 706.

Figure 8A:
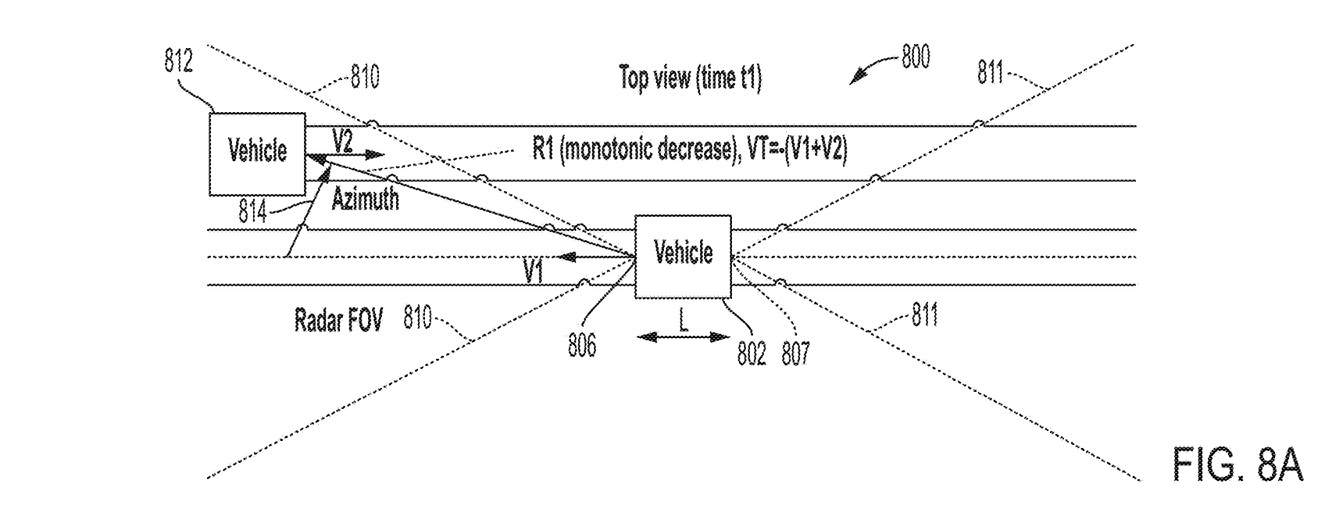
FIGS. 8A and 8B depict a top-view of a sequence of events using a low-speed determination system, in accordance with an embodiment.
Figure 8B:
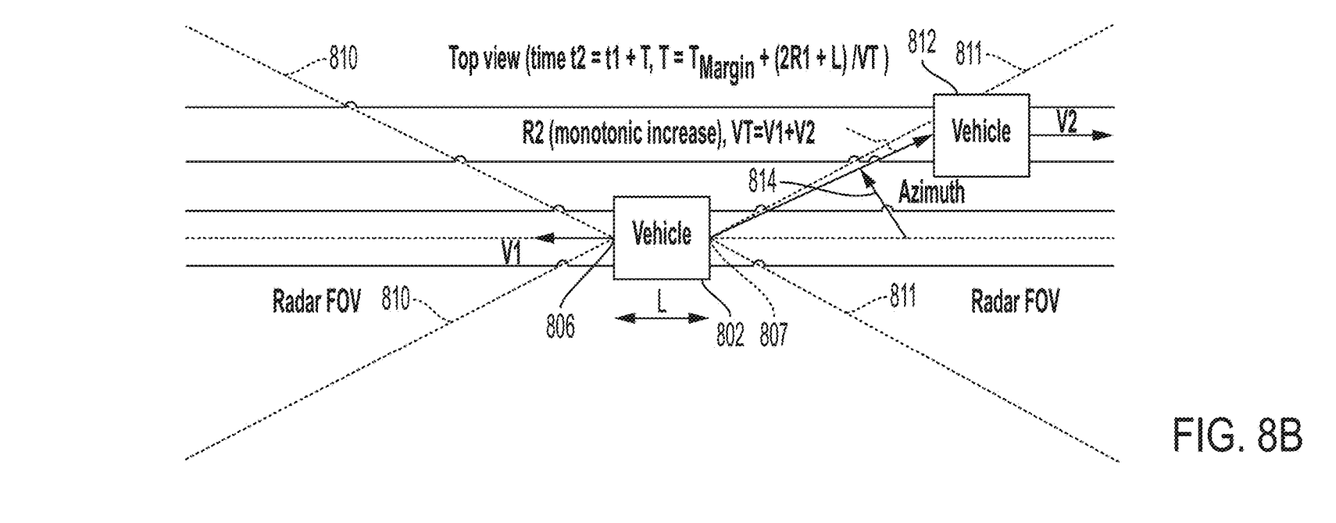

FIGS. 8A and 8B depict a top-view of a sequence of events using a low-speed determination system 800, in accordance with an embodiment. A first vehicle 802, having a length L, has a front facing radar 806 mounted at one end and a rear facing radar 807 at the other end. The front facing radar has a forward facing FOV 810 and a rearward facing FOV 811. At time t1, first vehicle 802 moves forward (toward the left hand edge of the page) with a velocity V1. The radar 806 detects a second vehicle 812, moving in the opposite direction of vehicle 802, having a velocity V2. As the first vehicle 802 and the second vehicle 812 approach each other, the radar 806 detects the second vehicle 812. The data collected by the radar 806 is used to determine the range R1 to the second vehicle 812. As time progresses, the range R1 monotonically decreases and the relative velocity VT is equal to the negative sum of the velocity V1 and the velocity V2 (VT=−(V1+V2). The first radar 806 determines the azimuth angle 814 of the approaching second vehicle 812 with respect to the first vehicle's direction of motion.

At time t2, where t2=t1+T, T being $T_{Margin}+(2R1+L/VT)$, the second vehicle 812 has passed the first vehicle 802 and has been detected by the second radar 807 when the second vehicle 812 enters the FOV 811 of the second radar 807. The first radar 806 detected a moving target 812 with an approaching speed VT. Given the vehicle 802 length L and the relative velocity VT, the second radar 807 detects the target 812 after a certain time period T predicted by the system based on $T=T_{Margin}+(2R+L)/VT$ and the target speed V2 will have the same magnitude VT but opposite direction (receding instead of approaching). R is the range measure to the moving target by the first radar and $T_{Margin}$ is a time margin to accommodate the radar "blind" zones between the FOV 810 of radar 806 and the FOV 811 of radar 807. $T_{Margin}$ is determined in such a way that error in R and VT are considered as well as the radar report cycle. The radar report cycle may be doubled as a factor in calculating $T_{Margin}$. In some embodiments, a radar report cycle is 50 ms to 100 ms. The error in R is primarily dominated by the radar's range resolution which is a function of the radar's frequency bandwidth ($\delta R \approx c/2B$ where B is the radar's frequency bandwidth) and the number of range bins used in the signal processing. The error in the relative radial speed (VT) is primarily dominated by the radar's speed resolution which is a function of the radar's wave length ($\lambda$), the number chirps in the frame (N) and the total chirp duration ($T_C$), i.e., $W=\lambda/(2NT_C)$ and the number of speed bins used in the signal processing.

The quality of the measurements made by radar 806 is affected by moving target 812 within FOV 810, or by the dynamic motion and vibration of the vehicle 802, however, the method reduces the impact of such adverse effects by using two radar sets 806 and 807 where each radar is installed on different ends of the vehicle (i.e., one radar 806 is installed on the "front" end of the vehicle while the other radar 807 is installed on the "rear" end of the vehicle). The quality of the measurements of two radars 806 and 807 are not simultaneously affected by the moving object 812. When the moving object 812 is a vehicle moving on the adjacent tracks, the motion of the vehicle 812 affects both radars 806 and 807 in spatial and temporal diversity.

If the vehicle 802 is stationary, the radar 806 measures the range and relative velocity with respect to non-moving targets on the ground plane and the range to these targets will not change. If the range to the targets changes, and the vehicle 802 remains stationary, the range only changes within predefined displacement, typically 10 cm or less. Because the radar 806 determines the range and relative speed to target 812, where the speed is determined based on the Doppler effect, there is a risk that moving objects within the radar FOV 810 will have affect the stationary state determination. In order to mitigate this risk and reduce the effect on the integrity of the stationary state determination function, two radars 806 and 807, each radar installed on different end of the vehicle 802, are used to determine the stationary state.

If the quality of the measurements made by radar 806 are affected by a moving object 812 within the FOV of the radar 806 and the object is moving on the adjacent tracks (nearby passing vehicle), then the effect of this same object on the measurements made by the other radar 807 are calculated in terms of the effects on time, range and speed measurements by the radar.

In accordance with an embodiment, radar 806 is manufactured by a different manufacturer than radar 807. Further radars could be installed, each having different manufacturers.

In accordance with an embodiment, radar 806 and radar 807 could use different radar frequency bands, bandwidths, beam form or other radar features. Further radars could be installed, each using different radar frequency bands, bandwidths, beam form or other radar features.

Figure 9:
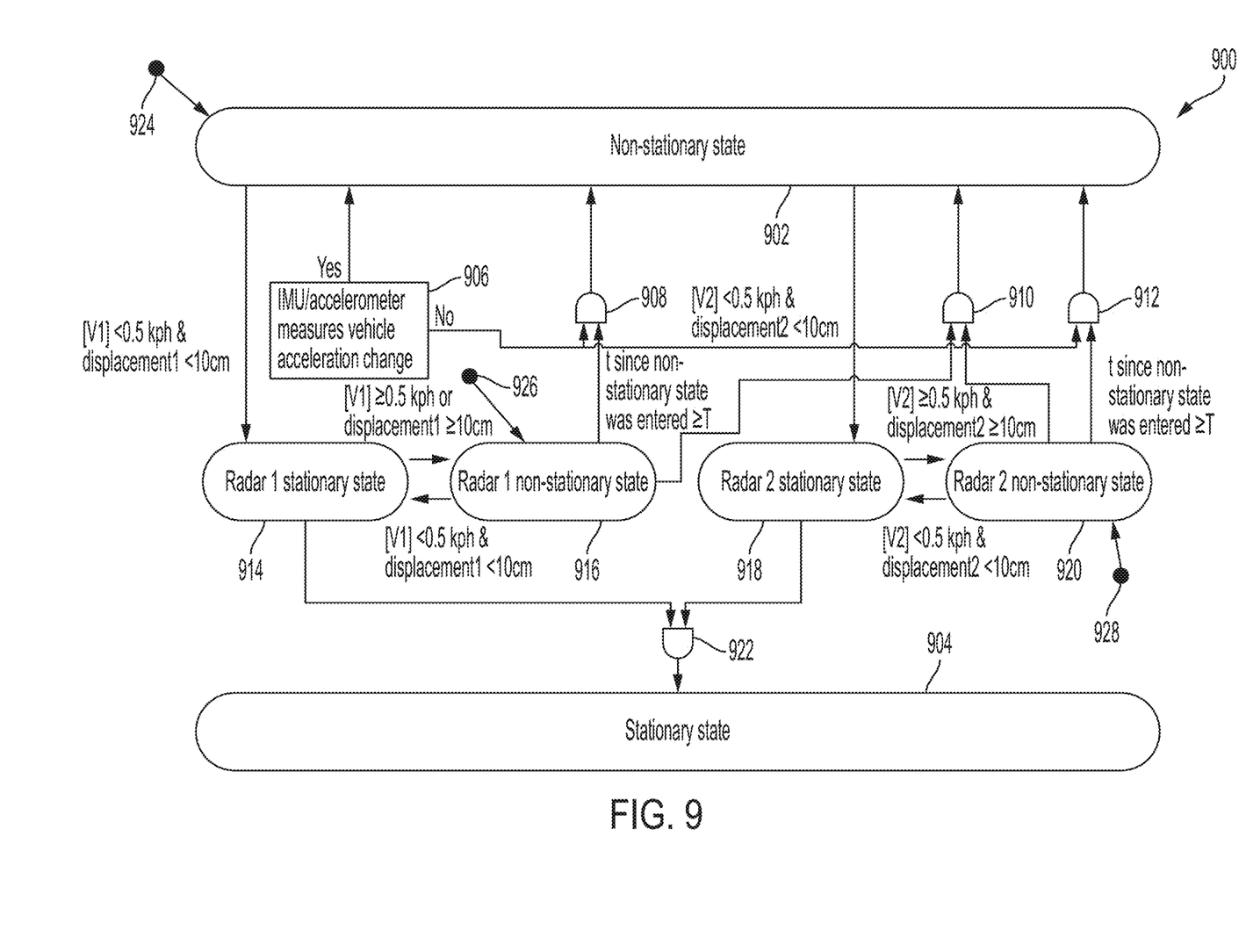
FIG. 9 depicts a state machine diagram 900 for a low-speed determination system and method, in accordance with an embodiment.
Figure 10:
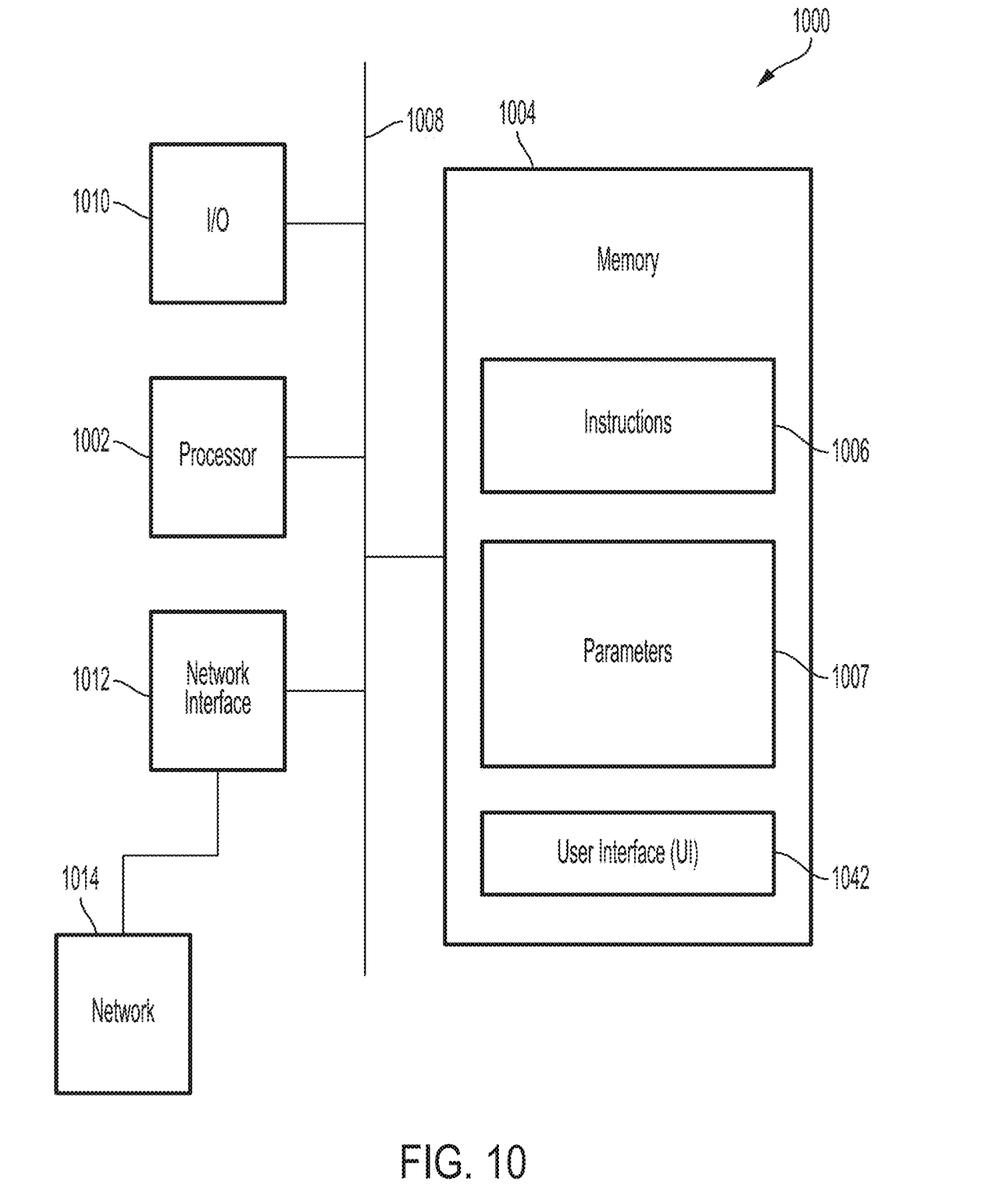
FIG. 10 is a high-level block diagram of a processor-based system usable in conjunction with one or more embodiments.

FIG. 9 is a state machine diagram 900 for a low-speed determination system and method, in accordance with an embodiment. In some embodiments, state machine diagram 900 describes a set of instructions, e.g., instructions 1006 (FIG. 10), executed by a processor, e.g., processor 1002 (FIG. 10). The system incudes a vehicle, e.g., vehicle 202, 302, 502, or the like, having a first radar (radar 1), e.g., radar 806, and a second radar (radar 2), e.g. radar 807. The low-speed determination system is in a vehicle non-stationary state 902 or a vehicle stationary state 904, a radar 1 stationary mode 914 or a radar 1 non-stationary mode 916 and a radar 2 stationary mode 918 or a radar 2 non-stationary mode 920.

Initially, the system begins in one of a vehicle non-stationary state 902, a radar 1 non-stationary mode 916 and a radar 2 non-stationary mode 920, represented by arrows 924, 926 and 928. The initial state is non-stationary.

When the velocity V1 measured by radar 1 has an absolute value less than 0.5 kph and the displacement of the vehicle as measured by radar 1 is less than 10 cm, the system transitions from the radar 1 non-stationary mode 916 to the radar 1 stationary mode 914. When the velocity V1 measured by radar 1 has an absolute value greater than 0.5 kph or the displacement measured by radar 1 is greater than or equal to 10 cm, the system transitions from the radar 1 stationary mode 914 to radar 1 non-stationary mode 916. When the velocity V1 measured by radar 1 has an absolute value less than 0.5 kph and the displacement measured by radar 1 is less than 10 cm, the system transitions back from the radar 1 non-stationary mode 916 to the radar 1 stationary mode 914.

When the velocity V2 measured by radar 2 has an absolute value less than 0.5 kph and the displacement of the vehicle as measured by radar 2 is less than 10 cm, the system transitions from radar 2 non-stationary mode 920 to the radar 2 stationary mode 919. When the velocity V2 measured by radar 2 has an absolute value greater than 0.5 kph or the displacement measured by radar 2 is greater than or equal to 10 cm, the system transitions from the radar 2 stationary mode to the radar 2 non-stationary mode 920. When the velocity V2 measured by radar 2 has an absolute value less than 0.5 kph and the displacement measured by radar 2 is less than 10 cm, the mode transitions back from the radar 2 non-stationary mode 920 to the radar 2 stationary mode 918.

An IMU/accelerometer, e.g., IMU/accelerometer 308 (FIG. 3), measurement is provided as an input to a determination of vehicle acceleration change at decision block 906. If the IMU/accelerometer measures a change in acceleration of the vehicle, the system is in a non-stationary state 902. In some embodiments, the change in acceleration must exceed a predetermined threshold acceleration change value in order for a vehicle acceleration change to take the Yes transition. In at least some embodiments, the predetermined threshold acceleration change value for the transition from stationary to non-stationary is 0.05 m/s$^2$ to 0.1 m/s$^2$. For a rail vehicle the typical maximum acceleration in the transition from stationary to non-stationary (full throttle) is about 1 m/sec$^2$. If the IMU/accelerometer does not measure a vehicle acceleration change and (as represented by AND gate 908) the system is in radar 1 non-stationary mode 914 at time t since the vehicle non-stationary state was entered, t being greater than or equal to T, the system is in a vehicle non-stationary state 902. T and t are related to the trigger from 916/920 to 910. In at least one embodiment, the two radars are asynchronous and therefore one to two radar cycles are tolerated before the state transition is made. In at least some embodiments, a radar cycle is from 50 msec to 100 msec. If the IMU/accelerometer does not measure a vehicle acceleration change and (as represented by AND gate 912) the state machine 900 is in radar 2 non-stationary mode 920 at time t since the vehicle non-stationary state was entered, t being greater than or equal to T, the system is in a vehicle non-stationary state 902. If the system is in radar 1 non-stationary mode 916 and (as represented by AND gate 910) radar 2 non-stationary mode 920, the state machine is in a vehicle non-stationary state 902.

If the system is in radar 1 stationary mode 914 and (as represented by AND gate 922) radar 2 stationary mode 918, the system is in a vehicle stationary state 904.

The low-speed determination system and method determines the vehicle stationary state 904 (typically speed less than 0.5 kph and displacement less than 10 cm) of a vehicle 802 and specifically rail vehicle using radar 806 with time-of-flight based range (to target) measurement capability. In at least some embodiments, radar 806 is an automotive radar. The radar 806 is, in accordance with various embodiments, a radar that reports range, azimuth, Doppler speed or the like.

The two radars 806 and 807 determine the vehicle state is in a vehicle stationary state 904 when the measurements (range & speed) from both radars satisfy the conditions for determining that the vehicle is in a vehicle stationary state 904 (i.e. typically speed<0.5 kph and displacement<10 cm).

While the vehicle state is stationary, two radars, e.g., radars 806 and 807 (FIG. 8), are used to determine if the vehicle state is maintained stationary and if the measurements from one of these radars do not satisfy the conditions for determining vehicle stationary state 904 (i.e., typically speed<0.5 kph or displacement<10 cm), then the vehicle stationary state 904 will be maintained if all the following conditions are satisfied, otherwise the system will transition to the vehicle non-stationary state 902:

First condition: the acceleration measured by the IMU or single axis accelerometer did not change by more than a predetermined MAX_ACCELERATION_CHANGE_TO DETECT_MOTION value (typically 0.05 m/sec$^2$ to 0.1 m/sec$^2$).

Second condition: the measurements from the other radar satisfy the conditions for determining vehicle stationary state 904 (i.e., typically speed<0.5 kph and displacement<10 cm).

Third condition: after T time period, the measurements from the radar indicating vehicle non-stationary state 902 transition to the vehicle stationary state 904 and then all radars indicate vehicle stationary state 904, or the measurements from the other radar transition to the vehicle non-stationary state 902 and then transition back to the stationary state 904 after T time period.

If two radars are used to determine the vehicle stationary state 904, the two radars are installed on different ends of the vehicle, then vehicle non-stationary state 902 will be determined if one of the following conditions is satisfied:

First condition: the acceleration measured by the IMU or single axis accelerometer 308 changed by more than the MAX_ACCELERATION_CHANGE_TO DETECT_MOTION (typically 0.05 m/sec$^2$ to 0.1 m/sec$^2$).

Second condition: all radars, e.g., radars 806, 807 FIG. 8), indicating vehicle non-stationary state 902.

Speed and displacement determined by the body mounted radar 806 represent the actual ground speed and displacement of the vehicle, while wheel/axle mounted sensors provide speed and displacement inferences.

The vehicle stationary state 904 is determined by vehicle body mounted sensors such as radar, IMU or single axis accelerometer and not by wheel/axle mounted sensors that are affected by wheel spin or slide.

Sensors such as radar, IMU or a single axis accelerometer, used to determine the vehicle odometry, are vehicle body mounted and not bogie/axle/wheel mounted, resulting in easier maintenance and higher reliability because the environmental conditions observed by the vehicle body mounted sensors are less harsh than the environmental conditions that exist at the bogie/axle/wheel.

The system uses two radars 806 and 807, with each radar installed on a different end of the vehicle 802. At both ends of the vehicle 802, the corresponding radar 806 and 807 is installed in such a way that FOV 810 and 811 provide measurements of range and relative velocity in a region of interest in front of each radar. In some embodiments, the FOV 810 and/or 811 is between the two rails from 3 m to 15 m ahead of the radar. The radars 806 and 807 are augmented with an IMU or single axis accelerometer 308 measuring the vehicle's acceleration along the primary axis of the vehicle. The data provided by the two radars 806 and 807 and the IMU/accelerometer 308 are used to determine if the vehicle 802 is in the vehicle stationary state 904 or the vehicle non-stationary state 902 as described above.

FIG. 10 is a block diagram of a vehicle motion detection system 1000 in accordance with some embodiments.

In some embodiments, vehicle motion detection system 1000 is a general purpose computing device including a hardware processor 1002 and a non-transitory, computer-readable storage medium 1004. Storage medium 1004, amongst other things, is encoded with, i.e., stores, computer program code 1006, i.e., a set of executable instructions. Execution of instructions 1006 by hardware processor 1002 represents (at least in part) a vehicle motion detection tool which implements a portion or all of the methods described herein in accordance with one or more embodiments (hereinafter, the noted processes and/or methods).

Processor 1002 is electrically coupled to computer-readable storage medium 1004 via a bus 1008. Processor 1002 is also electrically coupled to an I/O interface 1010 by bus 1008. A network interface 1012 is also electrically connected to processor 1002 via bus 1008. Network interface 1012 is connected to a network 1014, so that processor 1002 and computer-readable storage medium 1004 are capable of connecting to external elements via network 1014. Processor 1002 is configured to execute computer program code 1006 encoded in computer-readable storage medium 1004 in order to cause system 1000 to be usable for performing a portion or all of the noted processes and/or methods. In one or more embodiments, processor 1002 is a central processing unit (CPU), a multi-processor, a distributed processing system, an application specific integrated circuit (ASIC), and/or a suitable processing unit.

In one or more embodiments, computer-readable storage medium 1004 is an electronic, magnetic, optical, electromagnetic, infrared, and/or a semiconductor system (or apparatus or device). For example, computer-readable storage medium 1004 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1004 includes a compact disk-read only memory (CD-ROM), a compact disk-read/write (CD-R/W), and/or a digital video disc (DVD).

In one or more embodiments, storage medium 1004 stores computer program code 1006 configured to cause system 1000 to be usable for performing a portion or all of the noted processes and/or methods. In one or more embodiments, storage medium 1004 also stores information which facilitates performing a portion or all of the noted processes and/or methods. In one or more embodiments, storage medium 1004 stores parameters 1007.

Vehicle motion detection system 1000 includes I/O interface 1010. I/O interface 1010 is coupled to external circuitry. In one or more embodiments, I/O interface 1010 includes a keyboard, keypad, mouse, trackball, trackpad, touchscreen, and/or cursor direction keys for communicating information and commands to processor 1002.

Vehicle motion detection system 1000 also includes network interface 1012 coupled to processor 1002. Network interface 1012 allows system 1000 to communicate with network 1014, to which one or more other computer systems are connected. Network interface 1012 includes wireless network interfaces such as BLUETOOTH, WIFI, LTE, WIMAX, GPRS, or WCDMA; or wired network interfaces such as ETHERNET, USB, or IEEE-1364. In one or more embodiments, a portion or all of the noted processes and/or methods, is implemented in two or more systems 1000.

System 1000 is configured to receive information through I/O interface 1010. The information received through I/O interface 1010 includes one or more of instructions, data, design rules, libraries of standard cells, and/or other parameters for processing by processor 1002. The information is transferred to processor 1002 via bus 1008. Vehicle motion detection system 1000 is configured to receive information related to a UI through I/O interface 1010. The information is stored in computer-readable medium 1004 as user interface (UI) 1042.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 11:
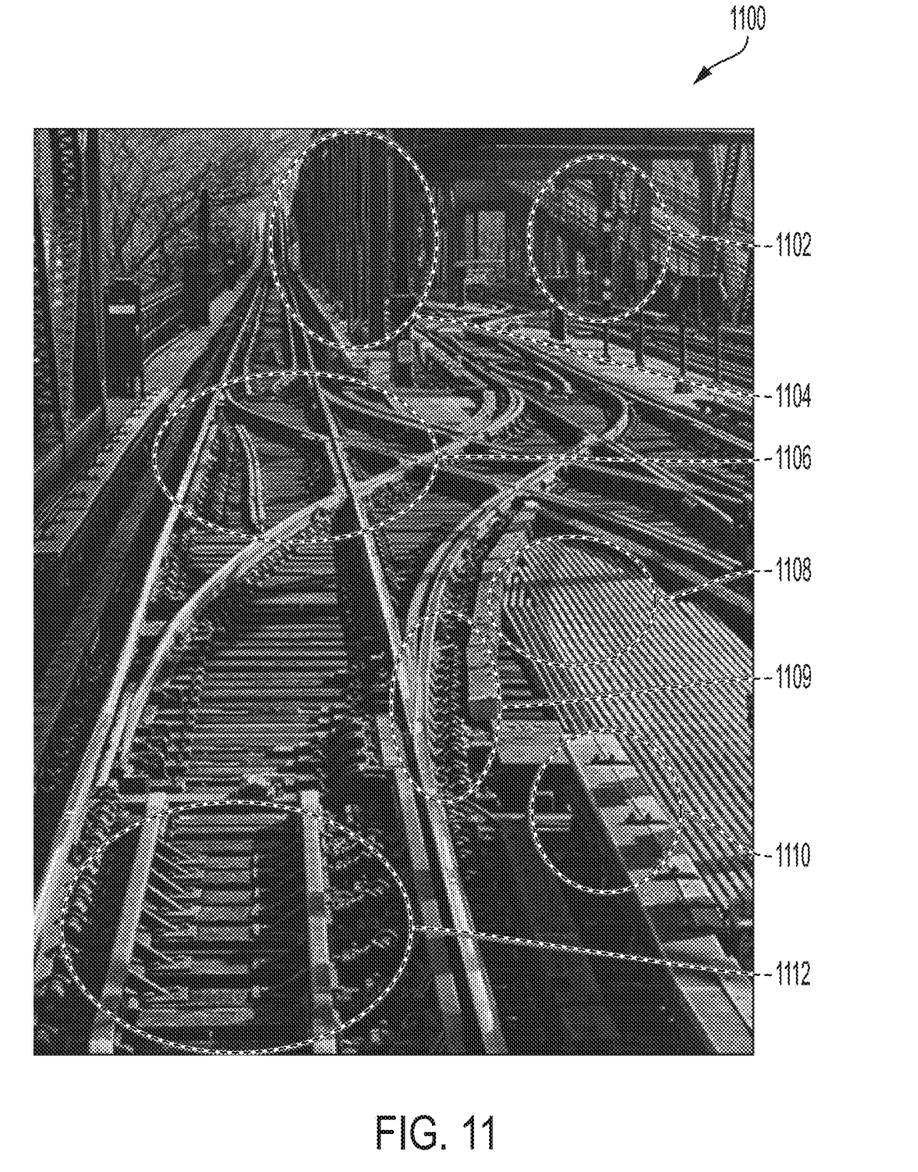
FIG. 11 is a depiction of a railway environment including reflective elements, in accordance with an embodiment.

FIG. 11 depicts a standard rail environment 1100, in accordance with an embodiment. In a standard rail environment, a variety of reflective objects are present. Those objects include signal posts 1102, metal beams 1104, switch elements 1106, catwalks 1108, catwalk rail tie plates 1109, power rails 1110, additional rail such as guard rails or linear induction motor rails 1112 or any other suitable reflective object.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for determining a stationary state of a rail vehicle on a track, comprising:
    a first radar mounted at an end of the rail vehicle, wherein the first radar measures a first velocity of the rail vehicle;
    a second radar mounted at another end of the rail vehicle, wherein the second radar measures a second velocity of the rail vehicle;
    a wheel mounted speed sensor mounted on the rail vehicle, wherein the wheel mounted sensor measures a third velocity of the rail vehicle;
    a series of fixed reflective track features along the track; and
    a processing unit, communicably connected with the speed sensor, the first radar and the second radar;
    wherein the processing unit is configured to receive data from the first radar corresponding to a first distance to one of the fixed reflective track features to determine a first displacement and to receive data from the second radar corresponding to a second distance to another one of the fixed reflective track features to determine a second displacement;
    and wherein the processing unit is configured to determine the rail vehicle is in a stationary state responsive to the first velocity, and the second velocity and third velocity being less than a predetermined threshold velocity and the first displacement and the second displacement being less than a predetermined threshold displacement.

2. The system of claim 1, wherein the first radar and the second radar use a range-to-target measurement technology to measure vehicle motion at low speed.

3. The system of claim 1, wherein the reflective elements are one or more of at least a portion of a track, a signal post, a metal beam, a switch element.

4. The system of claim 1, wherein the system is configured to determine a low-speed condition.

5. The system of claim 1, wherein the first radar and the second radar each have a field of view that includes a distance of three meters.

6. The system of claim 1, wherein the first radar and the second radar each have a field of view that includes a distance of fifty meters.

7. The system of claim 1, wherein the first radar and the second radar are configured to measure relative, with respect to the reflective elements, radial speed of the vehicle.

8. The system of claim 7, wherein the first radar and the second radar are configured to use Doppler frequency shift to measure relative radial speed.

9. The system of claim 1, wherein the first radar and the second radar are configured to measure radial range between the radar and the reflective element.

10. The system of claim 1, wherein the first radar and the second radar are configured to use round trip time of flight to measure the radial range.

11. A method of detecting a stationary state of a rail vehicle on a track comprising the steps of:
    detecting fixed metallic reflective track features along the track using radar signals; and
    determining a first velocity of the rail vehicle using a first radar;
    determining a second velocity of the rail vehicle using a second radar;
    determining a third velocity of the rail vehicle using a wheel mounted speed sensor;

determining a first displacement using the first radar to measure a first distance to a fixed metallic track feature;

determining a second displacement using a second radar to measure a second distance to another fixed metallic track feature;

determining the rail vehicle is in a stationary state responsive to the first velocity, and the second velocity and third velocity being less than a predetermined threshold velocity and the first displacement and the second displacement being less than a predetermined threshold displacement.

12. The method of claim 11, wherein the first radar and the second radar use a range-to-target measurement technology to measure vehicle motion at low speed.

13. The method of claim 11, further including the step of detecting the speed of the vehicle using an inertial speed sensor, wherein the inertial speed sensor is an inertial measurement unit.

14. The method of claim 11, wherein the first radar and the second radar are frequency modulated continuous wave radars.

15. The method of claim 12 wherein the first radar is mounted at one end of the vehicle and the second radar is mounted at the other end of the vehicle.

16. The method of claim 11, wherein the reflective elements are one or more of at least a portion of a track, a signal post, a metal beam, a switch element.

17. A method of determining a stationary state of a rail vehicle on a track, comprising the steps of:

measuring a first velocity and a first displacement of the rail vehicle using a first radar by detecting fixed metallic reflective track features;

measuring a second velocity and a second displacement of the rail vehicle using a second radar by detecting fixed metallic reflective track features;

measuring a third velocity using a wheel mounted speed sensor; and determining the rail vehicle is in a stationary state responsive to the first velocity, and the second velocity and third velocity being less than a predetermined threshold velocity and the first displacement and the second displacement being less than a predetermined threshold displacement.

18. The method of claim 17, further comprising measuring an acceleration of the rail vehicle using an inertial measurement unit and determining the rail vehicle is in a non-stationary state responsive to the acceleration being greater than a predetermined threshold acceleration.

19. The method of claim 17, further comprising determining a rail vehicle is in a non-stationary state responsive to the first velocity or the second velocity being greater than a predetermined threshold velocity.

20. The method of claim 17, further comprising determining a rail vehicle is in a non-stationary state responsive to the first displacement or the second displacement being greater than a predetermined threshold displacement.

* * * * *